(12) United States Patent
Licht

(10) Patent No.: US 6,529,806 B1
(45) Date of Patent: Mar. 4, 2003

(54) AUTONOMOUS NAVIGATING SYSTEM HAVING OBSTACLE RECOGNITION

(75) Inventor: Ulrich Licht, Troisdorf (DE)

(73) Assignee: GMD Forschungszentrum Informationstechnik GmbH, Sankt Augustin (DE)

( * ) Notice: Subject to any disclaimer, the term of this patent is extended or adjusted under 35 U.S.C. 154(b) by 0 days.

(21) Appl. No.: 09/700,193
(22) PCT Filed: May 12, 1999
(86) PCT No.: PCT/EP99/03258
§ 371 (c)(1), (2), (4) Date: Nov. 13, 2000
(87) PCT Pub. No.: WO99/59043
PCT Pub. Date: Nov. 18, 1999

(30) Foreign Application Priority Data

May 13, 1998 (DE) .......................................... 198 21 306

(51) Int. Cl.$^7$ .......................... G01C 22/00; G05D 1/00; G06F 19/00
(52) U.S. Cl. ............................. 701/23; 701/26; 701/27; 700/245; 700/250; 700/253
(58) Field of Search ............................. 701/23, 26, 27; 700/245, 250, 253, 258, 260

(56) References Cited

U.S. PATENT DOCUMENTS

| | | | |
|---|---|---|---|
| 5,130,632 A | * 7/1992 | Ezawa et al. | 318/568.11 |
| 5,321,614 A | 6/1994 | Ashworth | 701/26 |
| 5,590,244 A | * 12/1996 | Nakata et al. | 318/578 |
| 5,712,961 A | * 1/1998 | Matsuo | 33/559 |
| 5,732,195 A | * 3/1998 | Nakata et al. | 318/568.17 |
| 6,076,025 A | * 6/2000 | Ueno et al. | 701/23 |
| 6,338,013 B1 | * 1/2002 | Ruffner | 180/167 |

FOREIGN PATENT DOCUMENTS

| | | |
|---|---|---|
| EP | 0306768 | 3/1989 |
| EP | 0389459 | 9/1990 |

OTHER PUBLICATIONS

Caiti et al., Towards the realization of an artificial tactile system: fine discrimination by tensorial tactile sensor array and neural inversion algorithms; IEEE Transactions, Systems, Man, and Cybernetics, pp. 933–946, Jun. 1995.*

Korzeniowski et al., Three Dimensional object tracking using dual–drive Control; Proceedings of the 3rd Conference on Decision and Control, 1991; pp. 2458–2463, vol. 3.*

Payandeh, Toward interpretation of forces in compliant contact for recognition of grasped objects; Canadian Conference on Electrical and Computer Engineering, 1993., pp. 841–844, vol. 2.*

Beccari et al., Pose–independent recognition of convex objects from sparse tactile data; Proceedings of the 1997 IEEE international Conference on Robotics and Automation, pp. 3397–3402, vol. 4.*

* cited by examiner

Primary Examiner—Jacques H. Louis-Jacques
Assistant Examiner—Brian J. Broadhead
(74) Attorney, Agent, or Firm—Birch, Stewart, Kolasch & Birch, LLP

(57) ABSTRACT

An autonomous navigating system with obstacle recognition or a method for handling obstacles for an autonomous navigating comprises a sensor having a contact element prestressed in the direction of movement and movable against the prestressed force and a detector measuring the change in position of the contact element, and an evaluating device connected with the sensor which causes the system to stop when the sensor signal is greater or equal to a limit value ($U_G$), and which causes the system to stop, move around the obstacle or move on and thereby displace the obstacle, when the sensor signal is lower than the limit value ($U_G$).

6 Claims, 2 Drawing Sheets

AUTONOMOUS NAVIGATING SYSTEM HAVING OBSTACLE RECOGNITION

This application is the national phase under 35 U.S.C. § 371 of PCT International Application No. PCT/EP 99/03258 which has an International filing date of May 12, 1999, which designated the United States of America.

BACKGROUND OF THE INVENTION

1. Field of the Invention

The invention relates to an autonomous navigating system having obstacle recognition, in particular an intelligent obstacle recognition adapted to classify the obstacles.

2. Description of the Related Art

Since autonomous navigating systems move without a human driver, such systems must be provided with sensor technology to avoid that the autonomous navigating systems are blocked by obstacles within the traveling path. To achieve this, the obstacle must first be recognized. This is usually done with sensors such as radar or contact sensors, or with the use of image processing systems. When hitting an obstacle, the navigating system is stopped and, as a rule, an evading movement is started to avoid a collision between the autonomous system and the obstacle. Autonomous navigating systems copy the topography they move through on a virtual map on which all obstacles are marked. This virtual map is continuously updated by the sensor data so that disappeared or new occurring obstacles are marked. Each obstacle may be associated with a stationarity value indicating the number of sensor detections the obstacle is in the same position and orientation. Thus, in a long process, the navigating system can, in a sense, learn the stationary obstacles such as walls.

SUMMARY OF THE INVENTION

It is the object of the present invention to improve autonomous navigating systems with regard to their handling of movable obstacles.

The present autonomous navigating system comprises a sensor having a contact element for contacting an obstacle, the contact element being prestressed in the direction of movement and movable against the prestressed force, and a detector measuring the change in position of the contact element. In the present case, change in position means that at least a part of the contact element moves, e.g. by displacement or deformation. The sensor provides a sensor signal depending on the change in position to an evaluating device which in turn provides a first obstacle signal characterizing an obstacle not to be moved by the system, when the sensor signal is greater or equal to a limit value, and a second obstacle signal characterizing an obstacle to be moved by the system, when the sensor signal is less than the limit value. In case of a first obstacle signal, the system can either stop or move around the obstacle. In the case of a second obstacle signal, there is an additional option that the system moves on and thereby displaces the obstacle. This type of obstacle recognition has the advantage that the autonomous navigating system directly, i.e. without a long process of learning, recognizes whether an obstacle can be displaced by the system or not. Thus, the obstacle can be categorized immediately upon first detection by the autonomous system. Further, it is not only determined whether a movable or immovable obstacle is present, but whether it can be moved by the autonomous navigating system or not. This increases the range of activities and thereby the range of applications for such an autonomous navigating system.

Under ground conditions that allow only for a poor traction of the system, it may occur that the drive of the system temporarily loses ground contact which would result in a relief of the contact element and, thus, to the assumption that the obstacle can be moved. To avoid such interpretations, the evaluating device may be provided with additional sensor technology that allows for statements on the traction behavior of the system.

Preferably, the evaluating device includes a memory with stored sensor signal curves. By comparing a currently measured sensor signal curve to the sensor signal curves stored in the memory, different obstacles can be differentiated or categorized. With a movable obstacle, the contact element is typically moved against the prestressed force until the force transferred onto the obstacle is sufficient to overcome the static friction of the obstacle. Then, the force will slightly decrease between the system and the obstacle since the obstacle now moves with the lesser sliding friction. Suitable for a comparison of such curves is the point of the highest amplitude which is reached when the static friction is overcome, or the mean amplitude of the sliding friction portion of the sensor signal curve. With obstacles that cannot be moved by the system, it may be determined from the raising signal path up to the limit value, for example, whether the obstacle is elastically deformable. The obstacle is elastically deformable if the sensor signal does not increase linearly.

The sensor may be configured such that at least a part of the contact element is disposed transverse to the direction of movement and is deflectable, the deflectable portion of the contact element being provided with a wire strain gauge as a detector. This allows for a relatively simple and robust mechanical structure, since the contact element itself applies the prestressed force. In the area where an obstacle could be met, the contact element can be provided with an elastic, deformable damping element which reduces the mechanical stress on the sensor, on the one hand, and reduces major deflections of the contact element to the measurement range of the wire strain gauge or allows for an adaptation to obstacles of different weight or different speeds of the system, on the other hand.

In another embodiment, the change in position of the contact element can be measured contactlessly with optical sensors, for example, which is advantageous in that the oftentimes delicate detector is completely uncoupled from the contact element against which the obstacle may hit. This allows for a particularly robust structure of the sensor that can also take harder collisions with an obstacle.

BRIEF DESCRIPTION OF THE DRAWINGS

The following is a detailed description of several embodiments of the invention with reference to the drawings, wherein.

DETAILED DESCRIPTION OF THE PREFERRED EMBODIMENTS

Figure 1:
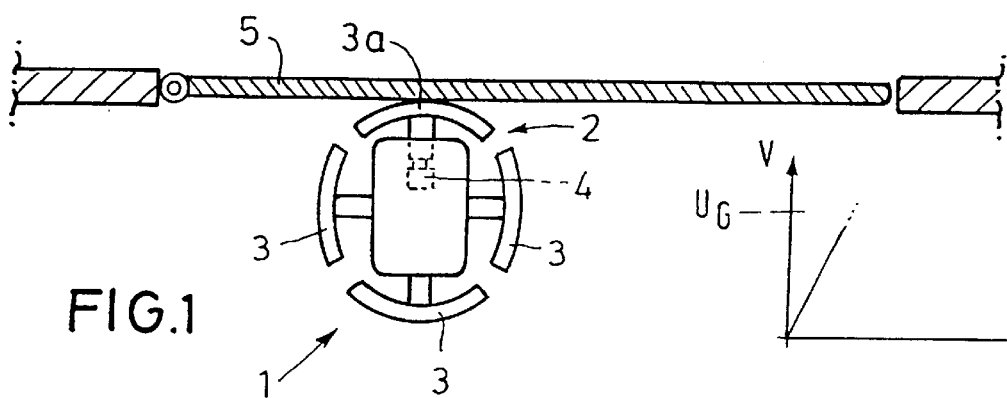
FIG. 1 illustrates an autonomous navigating system that has reached an obstacle.

Referring to FIGS. 1 to 3a, the behavior of an autonomous navigating system 1 according to the present invention will be discussed first. The autonomous navigating system 1 comprises sensors 2 arranged about the outer contour of the system 1 in a plane parallel to the ground surface on which the autonomous navigating system 1 moves. Each sensor is comprised of a contact element 3 which is arranged in an obstacle contact area and prestressed and movable in the respective direction of movement. Here, the direction relevant to each sensor 2 is the direction in which the system 1 moves, the respective sensor 2 being situated at the front side of the autonomous navigating system 1, seen in the direction of movement. Further, the sensor 2 has a detector 4 detecting the change in position of the contact element 3 relative to the detector 4 that is fixedly arranged within the autonomous navigating system 1.

In the embodiment described, only four sensors 2 or contact elements 3 that are located in the main directions of movement of the system 1 are illustrated. This distribution can be made more sophisticated by distributing o plurality of sensors 2 about the outer contour of the autonomous navigating system 1.

In FIG. 1, the autonomous navigating system 1 has just contacted an obstacle 5. In the present case, the obstacle 5 is a door that can be opened in the direction of movement of the system 1, provided it is not locked. As soon as the forward contact element 3a contacts the obstacle 5, the detector 4 detects the change in position of the contact element 3a, whereupon the sensor 2 provides a sensor signal to an evaluating device (not illustrated). The evaluating device can influence the movement of the system 1. However, the system first continues its movement in the same direction causing the contact element 3a to be moved against the prestressed force and opposite to the direction of movement.

Figure 1A:
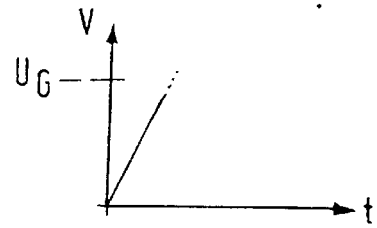
FIG. 1a illustrates the corresponding sensor signal curve.

The sensor 2 sequentially provides sensor signal values represented in a graph in FIG. 1a. The sensor signal values are plotted as voltage values over time. The value of the sensor signal increases with the amount of the change in position of the contact element 3a. When the contact element does not contact an obstacle, it is in a rest position determined by the amount of the prestressed force. Upon contact with an obstacle, the contact element 3 is displaced from this rest position, the value of the sensor signal increasing until it is stopped by a delimiting means at the maximum deflection. A limit value $U_G$ of the sensor signal is selected to be located just before this maximum deflection.

FIGS. 1 and 1a only show the beginning of the contact between the autonomous navigating system 1 and the obstacle 5 so that the autonomous navigating system 1 is still not sure, whether the obstacle 5 in the form of a door can be opened by the system 1, i.e. the sensor signal would remain below the limit value $U_G$, or whether the door cannot be opened by the system 1, resulting in a sensor signal value higher than the limit value $U_G$.

Figure 2:
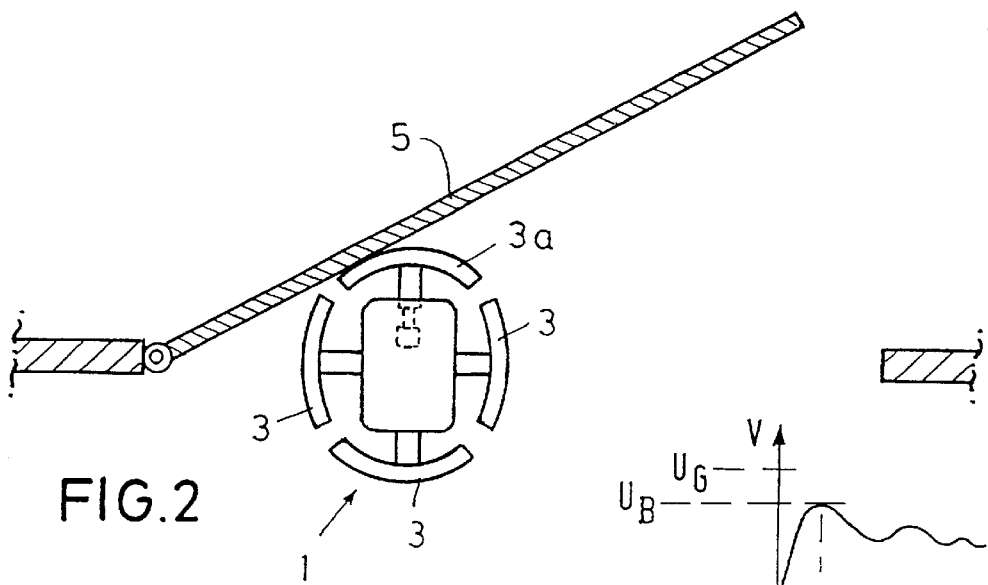
FIG. 2 shows the autonomous navigating system with an obstacle that can be moved by the system.
Figure 2A:
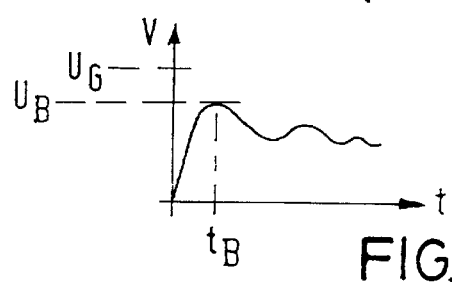
FIG. 2a illustrates the corresponding sensor signal curve.

In the case illustrated in FIGS. 2 and 2a, the drive force of the autonomous navigating system 1 is sufficiently strong to move the obstacle 5, i.e. to open the door. FIG. 2a illustrates an exemplary path of a sensor signal curve for an obstacle 5 to be moved by the system 1. Up to a time $t_B$, the sensor signal rises until the static friction of the obstacle 5 is overcome at $t_B$, whereupon the obstacle 5 starts to move. The maximum value $U_B$ of the sensor signal at the time $t_B$ is lower than the limit value $U_G$ of the sensor signal.

After the system 1 has started to move the obstacle 5, i.e. after the time $t_B$, the prestressed force moves the contact element 3a slightly in the direction of movement of the system 1 since the obstacle 5 only offers little resistance, namely the resistance offered by sliding friction instead of static friction, to the system 1 that contacts the obstacle 5 with the contact element 3a. The sensor signal curve illustrated in FIG. 2a represents this by an initial drop of the sensor signal value after the time $t_B$ followed by an oscillation around a lower average value. These oscillations are caused by the more or less irregular amount of the sliding friction.

Both the time $t_B$ and the value $U_B$ of the sensor signal that characterize the start of the movement of the obstacle 5 and the value of the sensor signal and the oscillation pattern in the sliding friction phase are dependent on the weight of the obstacle 5 and the surface and friction conditions between the obstacle 5 and the surface relative to which it is moved. Therefore, obstacles may be categorized using the sensor signal curves, one of which is shown as an example in FIG. 2a. If these sensor signal curves are stored in the autonomous system 1, it is not only possible to decide whether the obstacle can be moved by the autonomous navigating system 1, but it can also be determined which class of obstacles it belongs to or the obstacle can even be precisely identified if it has been categorized before.

Figure 3:
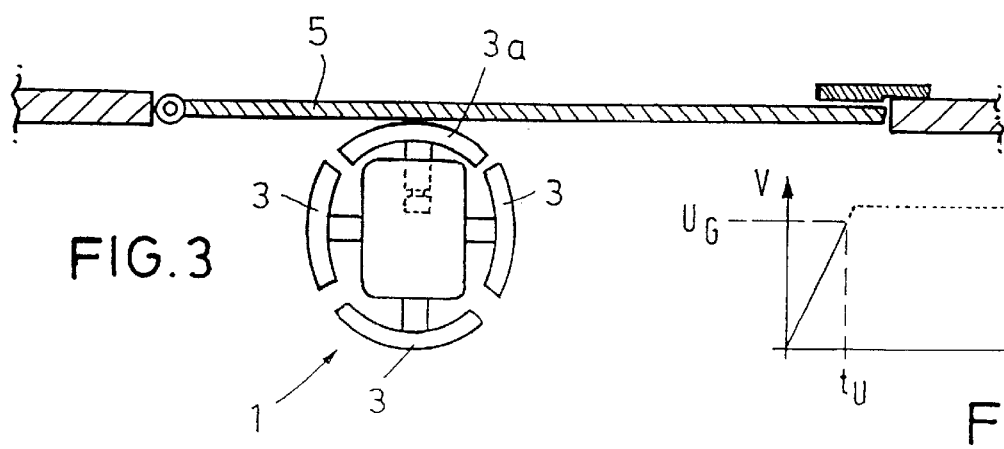
FIG. 3 shows the autonomous navigating system with an obstacle that cannot be moved by the system.
Figure 3A:
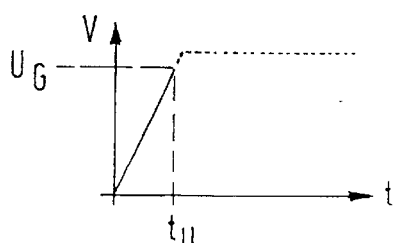
FIG. 3a illustrates the corresponding sensor signal curve.

FIGS. 3 and 3a illustrate the case where the autonomous navigating system 1 cannot move the obstacle 5, i.e. it cannot open the door locked with a bar. In this case, the system 1 moves against the obstacle 5 with the contact element 3a being ever further deflected from the rest position until a limit value $U_G$ of the sensor signal is reached. This happens at the time $t_U$ where it is certain that the obstacle is not movable. Suitably, the limit value $U_G$ is set such that it is lower than the measured value at which the contact element 3a has its limit. Upon reaching the limit value $U_G$, the evaluating device stops the system or causes the system 1 to move around the obstacle 5 on an alternative path.

Figure 4:
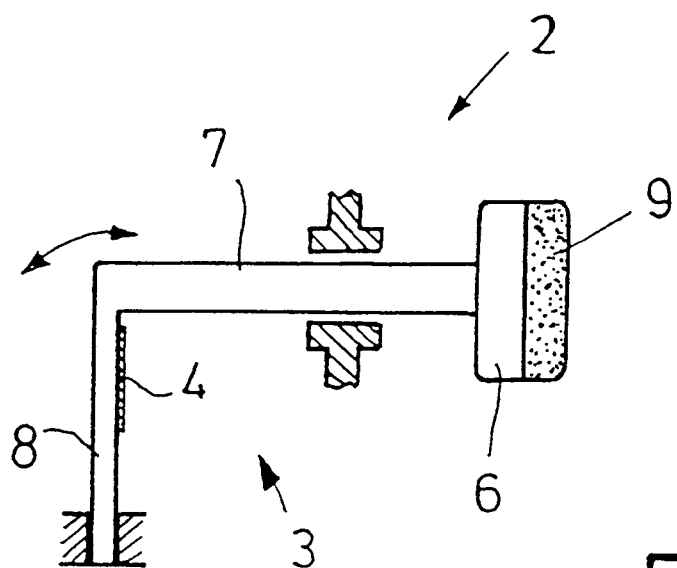
FIG. 4 shows a first embodiment of a sensor.

FIG. 4 illustrates a first embodiment of a sensor 2. The contact element 3 of the sensor 2 comprises a rail 6 arranged transverse to the direction of movement and mounted with a longitudinal support 7 slidable in the direction of movement. The longitudinal support 7 passes into a transverse support 8 which in turn is arranged transverse to the direction of movement. At the end opposite the longitudinal support 7, the transverse support 8 is firmly anchored in the autonomous navigating system 1. In the transition between the longitudinal support 7 and the transverse support 8, a detector 4 in the form of a wire strain gauge 8 is provided. The detector 4 is situated on the surface of the transverse support 8 that is directed toward the direction of movement.

When the system 1 meets an obstacle 5, the longitudinal support 7 is moved opposite the traveling direction, i.e. to the left in the present case, causing the transverse support 8 to be bent leftward. By this bending, the wire strain gauge is elongated resulting in a rise of the sensor signal. When the obstacle disappears or the static friction has been overcome, the contact element 3 moves back in the direction of movement, i.e. to the right, due to the prestressed force applied by the deformed transverse support. At the front of the rail 6, i.e. the surface directed toward the direction of movement, an elastically deformable damping element 9, e.g. of cellular rubber, is mounted damping the collision impact and reducing major deflections to the measurement range of the wire strain gauge.

Figure 5:
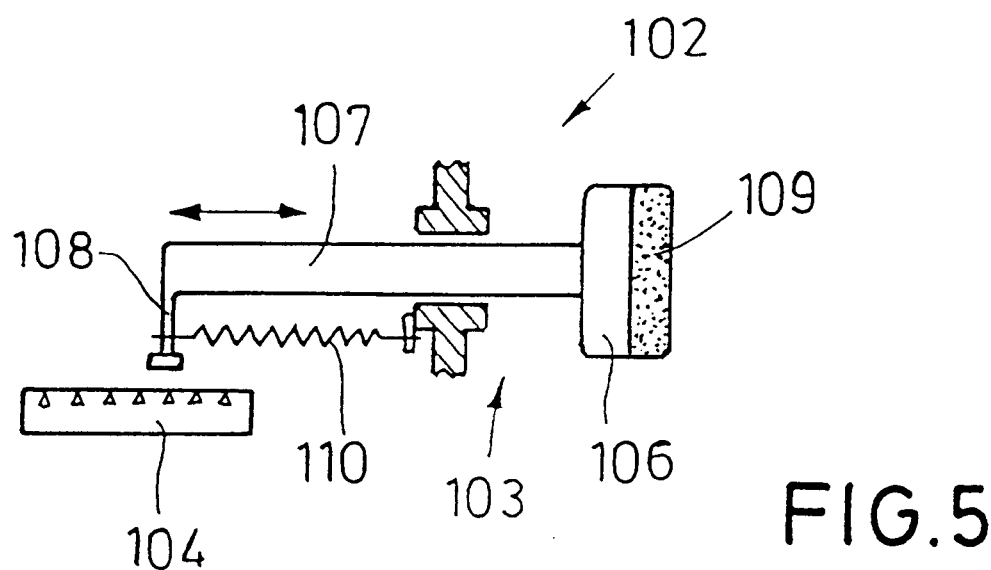
FIG. 5 illustrates a second embodiment of the sensor.

Referring to FIG. 5, a second embodiment of a sensor 102 will be described. The contact element 103 of the sensor 102 also has a rail 106 mounted to a longitudinal support 107. The front of the rail 106 is also provided with an elastically deformable damping element 109. The second end of the longitudinal support 107 is provided with an arm 108 that is not anchored but movable in the direction of movement of the system 1 together with the longitudinal support 107. The arm 108 serves as a reference for a detector 104 in the form of an optical sensor strip arranged in parallel to the direction of movement. The contact element 103 is prestressed by a spring 110 fastened to the arm 108 and a point that is stationary relative to the system 1. When the autonomous navigating system 1 hits an obstacle with its contact element 103, the contact element 103 is deflected against the traveling direction, i.e. to the left, the change of position being detected by the optical sensor strip. If no obstacle is present or the static friction of the obstacle has been overcome, the contact element 103 is driven in the direction of movement, i.e. to the right, by the restoring force of the spring 110.

What is claimed is:

1. An autonomous navigating system with obstacle recognition comprising:

a sensor having a contact element prestressed in a direction of movement and movable against a prestressed force and a detector measuring a change in position of the contact element, and providing a sensor signal depending on said change in position, an evaluating device connected with the sensor, which provides a first obstacle signal representing an obstacle that cannot be moved by the system, when the sensor signal is greater or equal to a limit value ($U_G$), and which provides a second obstacle signal representing an obstacle that can be moved by the system, when the sensor signal is lower than the limit value ($U_G$), wherein the system stops in response to a first obstacle signal or moves around the obstacle and, upon a second obstacle signal, has an additional option to move on and thereby displace the obstacle.

2. The autonomous navigating system of claim 1, characterized in that the evaluating device has a memory with sensor signal curves stored therein for differentiating between obstacles, the measured sensor signal curve being compared to the stored sensor signal curves.

3. The autonomous navigating system of claim 1, characterized in that at least a portion of the contact element is arranged transverse to a direction of movement and deflectable, the contact element being provided with a wire strain gauge as a detector.

4. The autonomous navigating system of claim 3, characterized in that an elastically deformable damping element is arranged on the contact element in a portion where an obstacle will make contact.

5. The autonomous navigating system of claim 1, characterized in that said change in position of the contact element is measured contactless.

6. A method for the handling of obstacles for an autonomous navigating system moving in a direction of movement, comprising the following steps:

measuring a force between the autonomous navigating system and an obstacle upon contact, classifying the obstacle based on said force, where
       with said force greater than a limit value ($U_G$), the obstacle is recognized as not being movable by the autonomous navigating system, and
       with said force lower than the limit value ($U_G$), the obstacle is recognized as being movable by the autonomous navigating system, stopping the autonomous navigating system or moving around the obstacle if the obstacle has been recognized as not movable, stopping the autonomous navigating system, moving around the obstacle or moving the autonomous navigating system on and thereby displacing the obstacle if the obstacle has been recognized as movable.

* * * * *